United States Patent
Norlin et al.

(10) Patent No.: US 9,064,160 B2
(45) Date of Patent: Jun. 23, 2015

(54) MEETING ROOM PARTICIPANT RECOGNISER

(75) Inventors: Cristian Norlin, Stockholm (SE); Caroline Hagglund, Stockholm (SE); Marcus Nyberg, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 217 days.

(21) Appl. No.: 13/574,056

(22) PCT Filed: Jan. 20, 2010

(86) PCT No.: PCT/SE2010/050049
§ 371 (c)(1),
(2), (4) Date: Jul. 19, 2012

(87) PCT Pub. No.: WO2011/090411
PCT Pub. Date: Jul. 28, 2011

(65) Prior Publication Data
US 2012/0293599 A1    Nov. 22, 2012

(51) Int. Cl.
*H04N 7/14* (2006.01)
*G06K 9/00* (2006.01)

(52) U.S. Cl.
CPC ........ *G06K 9/00979* (2013.01); *G06K 9/00221* (2013.01); *G06K 9/00892* (2013.01); *G06K 2009/00328* (2013.01); *H04N 7/147* (2013.01)

(58) Field of Classification Search
USPC ................................. 348/14.01, 14.08, 14.03
See application file for complete search history.

(56) References Cited

U.S. PATENT DOCUMENTS

| 7,224,786 B2 * | 5/2007 | Daugherty et al. ........... 379/145 |
| 7,227,566 B2 * | 6/2007 | Abe et al. ................... 348/14.05 |
| 2005/0062844 A1 | 3/2005 | Ferren et al. |

(Continued)

FOREIGN PATENT DOCUMENTS

| CN | 1783998 A | 6/2006 |
| CN | 101039359 A | 9/2007 |
| CN | 101502088 A | 8/2009 |

OTHER PUBLICATIONS

Ranganathan, et al., "Reasoning About Uncertain Contexts in Pervasive Computing Environments", IEEE Pervasive Computing, Apr. 1, 2004, vol. 3, No. 2, pp. 62-70, XP011265012.

(Continued)

*Primary Examiner* — Olisa Anwah
(74) *Attorney, Agent, or Firm* — Rothwell, Figg, Ernst & Manbeck P.C.

(57) ABSTRACT

An arrangement 100, 150, and corresponding method, which arrangement is configured to recognize a conference participant 101-103, 151-153 who is currently talking during a conference session The arrangement comprises an identifying unit 120, 170 including a biometric detector 121, 171 adapted to capture at least one biometric characteristic of the participant 101-103, 151-153, and a comparison unit 122, 172 adapted to compare the biometric characteristic to stored biometric characteristics in a database 110, 160, each stored characteristic being associated with an owner identity. The arrangement also comprises a display enabler 123, 173 adapted to, when a match is found between the captured biometric characteristic of the participant 101-103, 151-153 and a stored biometric characteristic in the—database 110, 160, enable display of the identity associated with the matching participant to other participants 101-103, 151-153, 140 in the conference session.

21 Claims, 5 Drawing Sheets

(56) References Cited

U.S. PATENT DOCUMENTS

| | | | |
|---|---|---|---|
| 2006/0259755 A1* | 11/2006 | Kenoyer | 713/1 |
| 2007/0188597 A1* | 8/2007 | Kenoyer | 348/14.08 |
| 2009/0123035 A1* | 5/2009 | Khouri et al. | 382/115 |
| 2009/0262914 A1 | 10/2009 | Khouri et al. | |
| 2010/0085415 A1* | 4/2010 | Rahman | 348/14.08 |
| 2010/0149305 A1* | 6/2010 | Catchpole et al. | 348/14.08 |
| 2013/0083154 A1* | 4/2013 | Kim et al. | 348/14.08 |

OTHER PUBLICATIONS

Office Action dated Dec. 16, 2014, Chinese Application No. 201080061752.9, (untranslated), 8 pages.

* cited by examiner

MEETING ROOM PARTICIPANT RECOGNISER

CROSS-REFERENCE TO RELATED APPLICATION

This application is a 35 U.S.C. §371 National Phase Entry Application from PCT/SE2010/050049, filed Jan. 20, 2010, and designating the United States, the disclosure of which is incorporated herein by reference.

TECHNICAL FIELD

The invention relates generally to an apparatus and a method for recognizing a conference participant who is currently talking in a conference session, the participant utilizing a conference facility such as a conference room that may be shared by several participants.

BACKGROUND ART

With today's more and more global world, with companies being global and interacting with other companies around the world and with today's constantly improving telecommunications means, it gets more and more common with conference meetings instead of personal meetings. It is a convenient, inexpensive and efficient way of conducting meetings as it does not require the different participants to travel long distances, which saves both time and money.

Sometimes all the participants know each other, but quite often at least some of the participants are not known to all other participants and also do not know all the other participants. It is desirable to provide information to all participants regarding who is currently talking in order both to make the meeting more personal but foremost to know who is saying what.

People may participate in meetings and conferences in several different ways, for example from a conference room, or from a personal computer or mobile phone. When a person participates using a personal device, this person may most often be recognized by the conference system by detecting the device that he/she is using so that the identity, i.e. the name of the person, can easily be displayed to the other participants when speech is received from that personal device.

A person may e.g. partake in a conference session utilizing a mobile phone. In case a person is utilizing a mobile phone for a conference session in a conference room, the interaction with any other participants in the same conference mom becomes unnatural. Usually, a conference room or the like is equipped with apparatuses, such as video cameras, microphones, displays, speakers and so on, by means of which the participants partake in a conference session. In case a participant is using a personal device in such a conference room, the interaction between any other participants in this room may be experienced as unnatural, as the natural behavior would be to utilize the equipment in the conference room for partaking in the conference session.

Most conference solutions involve using a conference room where multiple users or participants partake in the conference session and the conference session itself is established with one or more other conference rooms or participants at other locations. In this scenario, it is difficult to provide information to all participants regarding who is currently talking. Often, it is just possible to display an identity, such as a name, of the conference room so that all participants in a conference room, from which speech is received, are grouped together, without individual identification.

In some video conferencing solutions, one or more cameras are used that automatically zoom in on the participant who is currently talking. However, this function merely provides a view of the active speaker to the other participants, who may or may not recognize the speaker in view.

SUMMARY OF INVENTION

It is an object of the invention to address at least some of the problems outlined above. In particular, it is an object of the invention to enable recognizing a conference participant who is currently talking in a conference session, the participant utilizing a conference facility such as a conference room that may be shared by several participants, identifying the currently talking participant and to enable displaying the identity of the participant to other participants in the conference session.

According to one aspect, an apparatus is provided, configured to recognize a conference participant who is currently talking during a conference session. The apparatus comprises an identifying unit including a biometric detector adapted to capture at least one biometric characteristic of the participant, and a comparison unit adapted to compare the biometric characteristic to stored biometric characteristics in a database, each stored characteristic being associated with an owner identity. The apparatus further comprises a display enabler adapted to, when a match is found between the captured biometric characteristic of the participant and a stored biometric characteristic in the database, enable display of the identity associated with the matching participant to other participants in the conference session.

This arrangement may provide several advantages. One advantage is that any person, who is known to the conference system, and who wants to participate in a conference session, may simply enter the conference room or conference facility comprising the recognition apparatus. The fact that the person is known to the conference system means that there is an entry in the database comprising stored characteristics, which entry is a matching between the person's identity, i.e. owner identity, and at least one of his/her biometric characteristic. As soon as he/she speaks, the recognition apparatus captures at least one biometric characteristic of him/her and by matching the captured biometric characteristic to an owner identity, his/her identity may be displayed to other participants in the conference session. The person in question need not manually enter his/her personal identity every time when participating in a conference session.

According to one embodiment, the stored biometric characteristics have been associated with an owner identity during a preceding conference session in which the conference participant was using a personal device.

According to another embodiment, the apparatus is further adapted to store the captured at least one biometric characteristic in the database, optionally together with any possible RFID, Identity Information from a personal computer, mobile phone or personal conferencing client, or manually inputted Identity Information of the participant, if a match of the captured at least one biometric characteristic of a participant is not found.

In one example, the display enabler is further adapted to associate audio and/or video signals, transmitted to other participants in the conference session, with metadata comprising the owner identity of the matching participant or to transmit the identity information on a separate control channel concurrently with the transmission of audio and/or video signals relating to the conference session.

According to an embodiment, the identifying unit is further adapted to detect any possible RFID(s) associated with respective participant(s) and wherein the comparison unit is further adapted to compare the at least one captured biometric characteristic of the participant who is currently talking, firstly to the stored biometric characteristics which is/are associated with the owner identity corresponding to the detected RFID(s) and secondly, if a match is not found, to all stored biometric characteristics in the database.

According to one embodiment, the biometric detector is adapted to capture a voice pattern or facial recognition constituting the biometric characteristic of a participant who is currently talking.

In one example, the arrangement further comprises a memory adapted to temporarily store the captured biometric characteristic of an identified participant together with the identity of the owner of the biometric characteristic for the duration of the conference session and wherein the comparison unit is adapted to compare a captured biometric characteristic firstly to the temporarily stored biometric characteristics in the memory and secondly, if a match is not found, to the stored biometric characteristics in the database.

In another example, the apparatus is further adapted to create a temporary tag for the captured biometric characteristics of an identified participant in the database for the duration of the conference session and wherein the comparison unit further is adapted to compare a captured biometric characteristic firstly to biometric characteristics having a temporary tag in the database and secondly, if a match is not found, to all other stored biometric characteristics in the database, and wherein the arrangement further is adapted to remove the temporary tag(s) when the conference session is ended.

In yet another example, the apparatus further comprises a memory adapted to record and store the conference session together with any possible found identity information of a talking participant.

According to another aspect, a method is provided, for recognizing a conference participant who is currently talking during a conference session, the method comprising the following steps. Capturing at least one biometric characteristic of the participant. Comparing the biometric characteristic to stored biometric characteristics in a database, each stored biometric characteristics being associated with an owner identity. When a match is found between the captured biometric characteristic of the participant and a stored biometric characteristic in the database, enabling display of the owner identity associated with the matching participant to other participants in the conference session.

According to an embodiment, the stored biometric characteristics have been associated with an owner identity during a preceding conference session in which the conference participant was using a personal device.

According to another embodiment, wherein if a match of the captured at least one biometric characteristic of a participant is not found, the captured at least one biometric characteristic is stored in the database, optionally together with any possible RFID, Identity Information from a personal computer, mobile phone or personal conferencing client, or manually inputted Identity Information of the participant.

In one example, the identity of a participant not already known to the conference system is manually inputted at the beginning of the conference session.

In another example, enabling display of the owner identity associated with the matching participant comprises associating audio and/or video signals with metadata comprising the identity to be displayed to other participants in the conference session or transmitting the identity information on a separate control channel concurrently with the transmission of audio and/or video signals relating to the conference session.

In yet another example, the method further comprises the step of detecting any possible RFID(s) identifying respective participant(s) and comparing the at least one captured biometric characteristic of a participant who is currently talking, firstly to the stored biometric characteristics which is/are associated with the owner identity corresponding to the detected RFID(s) and secondly, if a match is not found, comparing the at least one captured biometric characteristic of a participant who is currently talking to the further stored biometric characteristics.

According to an embodiment, the captured biometric characteristic of a participant who is currently talking is voice pattern or facial recognition.

According to an embodiment, when a participant is identified for the first time during a conference session, his/her biometric characteristics is temporarily tagged in the database or temporarily stored in a memory for the duration of the conference session and when at least one biometric characteristic of a participant who is currently talking is captured, this biometric characteristics is firstly compared to the temporarily tagged biometric characteristics in the database or to the temporarily stored biometric characteristics in the memory, and if a match is not found, the captured at least one biometric characteristics is compared to the stored, non-tagged, biometric characteristics in the database.

In one example, when a conference session is ended, the tagging of captured biometric characteristics in the database is erased or the memory comprising the temporarily stored captured biometric characteristics is emptied of the temporarily stored biometric characteristics.

In one example, the method further comprises recording and storing the conference session in a memory or database together with any possible found identity information of a talking participant.

BRIEF DESCRIPTION OF DRAWINGS

The invention is now described, by means of exemplary embodiments and with reference to the accompanying drawings, in which.

DESCRIPTION OF EMBODIMENTS

In the following, a detailed description is provided of an exemplary apparatus configured to recognize a conference participant who is currently talking during a conference session likewise, an exemplary method of recognizing a conference participant who is currently talking during a conference session is described.

Figure 1:
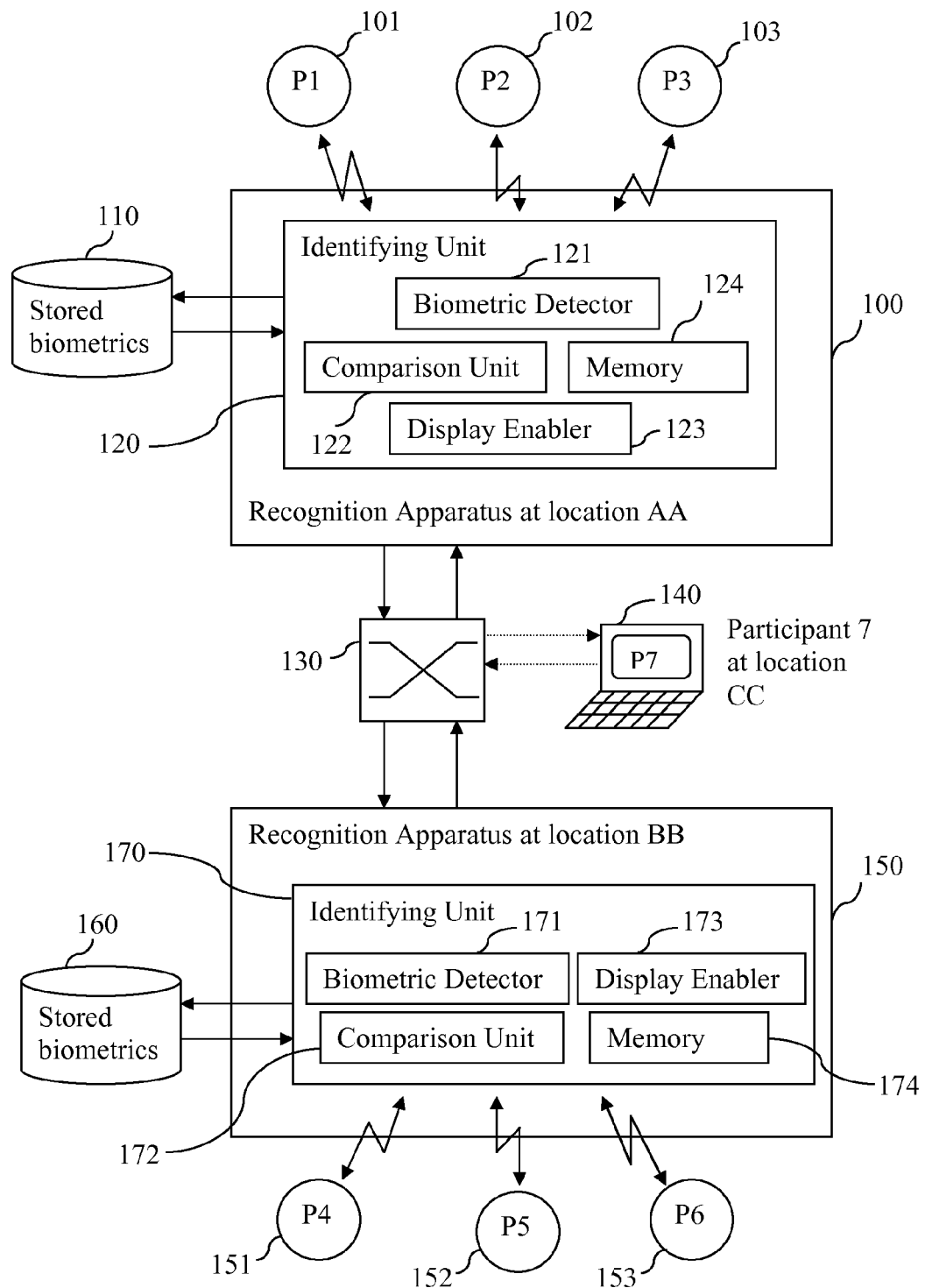
FIG. 1 illustrates schematically an ongoing conference session with seven participants located at three different locations.

FIG. 1 illustrates schematically an ongoing conference session with seven participants located at three different locations. In FIG. 1, an arrangement or Recognition Apparatus 100, 150 is configured to recognize a conference participant 101-103, 151-153 who is currently talking during a conference session. The recognition apparatus 100, 150 can be a part of a conference system or the like (not shown). In FIG. 1, there are seven participants in the conference session, P1, P2, . . . , P7, 101-103, 151-153 and 140. They are located at three different locations, AA, BB and CC. Both locations AA and BB have a Recognition Apparatus 100, 150 as part of a conference system at each location. The seventh participant 140 is located at location CC and is participating using a personal computer. The different locations AA, BB and CC are interconnected using, e.g. a telecommunications network such as e.g. a wireless communication network 130.

The arrangement 100, 150 comprises an identifying unit 120, 170 including a biometric detector 121, 171, which is adapted to capture at least one biometric characteristic of a participant 101-103, 151-153. The identifying unit 120, 170 also comprises a comparison unit 122, 172 adapted to compare the captured biometric characteristic to stored biometric characteristics in a database 110, 160. Each stored characteristic is associated with an owner identity. The owner identity can preferably be the name or an alias of the person who possesses the biometric characteristic. The identifying unit 120, 170 also comprises a display enabler 123, 173, which is adapted to, when a match is found between the captured biometric characteristic of the participant 101-103, 151-153 and a stored biometric characteristic in the database 110, 160, enable display of the identity associated with the matching participant 101-103, 151-153 to other participants 101-103, 151-153 and 140 in the conference session.

This arrangement may provide several advantages. One advantage is that any person, who is known to the conference system, and who wants to participate in a conference session, may simply enter the conference room or conference facility comprising the recognition apparatus 100, 150. The fact that the person is known to the conference system means that there is an entry in the database 110, 160 comprising stored characteristics, which entry is a matching between the person's identity, i.e. owner identity, and at least one of his/her biometric characteristic. As soon as he/she speaks, the recognition apparatus 100, 150 captures at least one biometric characteristic of him/her and by matching the captured biometric characteristic to an owner identity, his/her identity may be displayed to other participants 101-103, 151-153 and 140 in the conference session. The person in question need not manually enter his/her personal identity every time when participating in a conference session.

In the specific example illustrated in FIG. 1, participant P7 140 is using a personal computer to partake in the conference session. Even though he/she may not utilize a recognition apparatus 100, 150 as the other participant 101-103, 151-153, he/she may still be provided with the identity of each of participants P1, P2, . . . , F6 101-103, 151-153 as they speak. This will be further explained below. It should be noted that FIG. 1 merely illustrates various functional unit in the recognizer apparatus 100, 150 in a logical sense. However, the skilled person is free to implement these functions in practice using any suitable software and hardware means. Thus, the invention is generally not limited to the shown structures of the recognizer apparatus 100, 150 and their functional units.

In one example, the stored biometric characteristics have been associated with an owner identity during a preceding conference session in which the conference participant was using a personal device.

When a person participates in a conference session using a personal device, he/she may be identified by detecting the personal device. If the person is not known to the conference system before, at least one of his biometric characteristics is stored in the database 110 160 comprising stored biometrics, together with his/her personal identity. In other words, when the personal device is detected, its identity can be mapped to a personal or owner identity and thereby identify the participant partaking in the conference session using his/her personal device.

This has the advantage that the database 110, 160 of the conference system may be updated automatically with new matchings between a person's identity and at least one of his/her biometric characteristics as soon as that person, who is previously unknown to the conference system, participates in a conference session using a personal device, with the aid of which personal device, the person may be identified.

In another example, if a match of the captured at least one biometric characteristic of a participant 101-103, 151-153 is not found, the arrangement 100, 150 is further adapted to store the captured biometric characteristic in the database 110, 160, optionally together with any possible RFID, Identity Information from a personal computer, mobile phone or personal conferencing client, or manually inputted Identity Information of the participant 101-103, 151-153.

If a match of the captured biometric characteristic of a participant 101-103, 151-153 is not found, this means that the participant is participating using the conference system or recognition apparatus 100, 150 for the first time and is unknown to the conference system. The captured biometric characteristic is then stored in the database 110, 160. During the conference or after the conference, the participant in question 101-103, 151-153 may enter his/her personal identity into the system and thereby creating a matching in the database 110, 160 comprising the stored biometrics. The participant in question 101-103, 151-153 may also be identified during the conference session by an RFID, in case he/she has brought any kind of device or arrangement carrying an RFID that may identify the participant. The participant may also be identified by a personal device such as a mobile phone, a personal computer or personal conferencing client that may communicate with the conference system or recognizer apparatus 100, 150 in order to identify the participant.

According to an embodiment, the display enabler 123, 173 is further adapted to associate audio and/or video signals, transmitted to other participants 101-103, 151-153 and 140 in the conference session, with metadata comprising the owner identity of the matching participant or to transmit the identity information on a separate control channel concurrently with the transmission of audio and/or video signals relating to the conference session.

In relation to FIG. 1, participant P7 140 who is participating using a personal computer at location CC may still take advantage of the displaying of the identity of participants P1, P2, . . . , F6 101-103, 151-153. Identity information transmitted as metadata or on a separate control channel, is received by all participants 101-103, 151-153 and 140 in the conference session, including participant P7 140, and the identity information can be displayed also to participant P7 140 although he/she does not use or have access to the recognition apparatus 100, 150 that is present at location AA and BB.

The identity of the identified currently talking participant 101-103, 151-153 is to be transmitted to the other participants 101-103, 151-153 and 140 in the conference session in order for the identity to be displayed to the other participants.

One example of implementation is to associate audio and/or video signals, transmitted to other participants in the conference session, with metadata comprising the owner identity of the matching participant 101-103, 151-153 who is currently talking. As the other participant 101-103, 151-153 and 140 receive the audio and/or video signals, the metadata is analyzed/extracted so that the identity of the talking participant 101-103, 151-153 is displayed together with the audio and/or video information to the other participant 101-103, 151-153 and 140 receiving the transmission of audio and/or video signals.

Another example of implementation is to transmit the identity information on a separate control channel concurrently with the transmission of audio and/or video signals. As the other participant 101-103, 151-153 and 140 receive the audio and/or video signals concurrently with the identity information on the separate control channel, the identity information is analyzed or processed so that the identity of the talking participant 101-103, 151-153 is displayed together with the audio and/or video information to the other participants 101-103, 151-153 and 140 receiving the transmission of audio and/or video signals and the identity information on the control channel.

In one example, the identifying unit 120, 170 is further adapted to detect any possible RFID(s) associated with respective participant(s) 101-103, 151-153 in the conference session and wherein the comparison unit 122, 172 is further adapted to compare the at least one captured biometric characteristic of the participant is who is currently talking 101-103, 151-153, firstly to the stored biometric characteristics which is/are associated with the owner identity corresponding to the detected RFID(s) and secondly, if a match is not found, to all the stored biometric characteristics in the database 110, 160.

The database 110, 160 comprising the stored biometric characteristics and associated owner identities can contain a large amount of entries, each entry corresponding to a biometric characteristics and an associated owner identity. The larger amount of entries, the longer it takes to search the database 110, 160 for a match with a captured biometric characteristic of a person who is currently talking 101-103, 151-153.

A participant 101-103, 151-153 in the conference session can bring with him/her an RFID to the conference room or conference facility, which RFID identifies the participant 101-103, 151-153 in question. In other words, the RFID effectively provides the personal identity. The RFID may be comprised as an RFID tag in a personal device such as a mobile phone, a personal computer, a conferencing client or any other device or arrangement that may carry or hold an END. When the comparison unit 122,172 is to search the database 110, 160 for a match between a captured biometric characteristic and an owner identity thereof, the comparison unit 122, 172 firstly compares the captured biometric characteristic with that stored biometric characteristic which is associated with the owner identity corresponding to the detected RFID. If a match is not found, the comparison unit compares the at least one captured biometric characteristic of the participant 101-103, 151-153 who is currently talking to all the stored biometric characteristics in the database 110, 160.

Merely as an example, assume that the database 110, 160 comprises 3000 entries of personal identities associated with a biometric characteristic, or 3000 biometric characteristics associated with an owner identity. It should be noted that an owner identity is a personal identity of a person who has at least one specific biometric characteristic stored in the database 110, 160, which biometric characteristic is associated with the owner identity. Assume further that there are 5 participants in the conference session in one conference room, which conference mom is equipped with the recognition apparatus 100, 150 in question. In this example, the 5 participants all bring a personal END. Then the comparison unit only needs to search 5 entries in the database 110, 160 instead of 3000 entries in the database 110, 160. This example illustrates that the search duration can be reduced by limiting the amount of entries that has to be searched in order to find a match of a participant who is currently talking during a conference session and an owner identity thereof.

In one embodiment, the biometric detector 121,171 is adapted to capture a voice pattern or facial recognition constituting the biometric characteristic of a participant who is currently talking 101-103, 151-153.

Of course, other biometric characteristics may be used. However, as a conference session usually does entail people communicating by talking, voice pattern is one biometric characteristic that can be used. Also, as many conference sessions may entail video conference so that the participants are able to see each other, facial recognition is an example of another biometric characteristic that may be used. Video conference can be very important in case the participants use sign language to communicate. It may also enhance the experience for the partaking participants to be able to see each other, even in case they all communicate orally.

According to an exemplary embodiment, the apparatus 100, 150 is provided with a memory 124, 174 adapted to temporarily store the captured biometric characteristic of an identified participant 101-103, 151-153 together with the identity of the owner of the biometric characteristic for the duration of the conference session. In this example, the comparison unit 122, 172 is adapted to compare a captured biometric characteristic firstly to the temporarily stored biometric characteristics in the memory 124, 174 and secondly, if a match is not found, to the stored biometric characteristics in the database 110, 160.

This feature is another example of how a search of the entire database 110, 160 may be avoided every time a participant talks. When a participant 101-103, 151-153 who is currently talking, for the first time in the current ongoing conference session, is identified and when a match is found in the database 110, 160 between at least one captured biometric characteristic and an owner identity, this captured biometric characteristic is temporarily stored in the memory 124, 174 together with the identity of the owner of the captured biometric characteristic for the duration of the conference session. The next time the same participant 101-103, 151-153 is talking and the same biometric characteristic is again captured, the comparison unit 122, 172 will firstly compare the captured biometric characteristic to the temporarily stored biometric characteristics in the memory 124, 174 and will thereby find the owner identity, which then can be displayed to other participants 101-103, 151-153 and 140 in the conference session. Thereby, the comparison unit 122, 172 will not have to search the entire database 110, 160 in order to find the identity of the participant 101-103, 151-153 in question who is currently talking. Of course, when a participant talks for the first time, his/her biometric characteristic(s) will not have been captured before and the participant will not have been identified before in the conference session and will then not be found in the memory 124, 174.

When the conference session comes to an end, the temporarily stored captured biometric characteristic of an identified participant 101-103, 151-153 and his/her identity are deleted from the memory 124, 174.

According to another embodiment, the arrangement 100, 150 is further adapted to create a temporary tag for the captured biometric characteristics of an identified participant in the database 110, 160 for the duration of the conference session. The comparison unit 122, 172 is further adapted to compare a captured biometric characteristic firstly to biometric characteristics having a temporary tag in the database 110, 160 and secondly, if a match is not found, to all other stored biometric characteristics in the database 110, 160. The arrangement 100, 150 is further adapted to remove the temporary tag(s) when the conference session is ended.

This embodiment is an example of another solution of how to avoid having to perform a search of the entire database 110, 160 every time a participant 101-103, 151-153 talks. When a participant 101-103, 151-153, who is currently talking for the first time in the current conference session, is identified and when a match is found in the database 110, 160 between at least one captured biometric characteristic and an owner identity thereof, the entry in the database 110, 160 comprising the biometric characteristic and the owner identity is temporarily tagged in the database 110, 160. The next time the same participant is talking and at least one of his/her biometric characteristic is captured, the comparison unit 122, 172 will firstly compare the captured biometric characteristic to the temporarily tagged biometric characteristics in the database 110, 160 and will then find the owner identity, which then can be displayed to other participants 101-103, 151-153 and 140 in the conference session. Thereby, the comparison unit 122, 172 will not have to search the entire database 110, 160 in order to find the identity of the participant 101-103, 151-153 in question who is currently talking.

When the conference session has come to an end, all the temporary tags for this session are removed from the database 110, 160.

According to another exemplary embodiment, the arrangement 100, 150 further comprises a memory 124, 174 adapted to record and store the conference session together with any possible found identity information of a talking participant 101-103, 151-153.

By this feature, it is possible to record and store a conference session together with the information regarding the identified participants 101-103, 151-153. It is further possible to play out the conference session at a later point in time and then be provided with the identity information of each talking participant 101-103, 151-153 in the conference session. Of course, if a participant was not identified during the session and his/her identity was in no other way discovered or manually inputted, no identity information can be displayed in real time during the conference session nor from the recorded conference session. However, what he/she said during the conference session may be recorded and stored.

According to an embodiment, when a play out of a recorded and stored conference session is desired by a user, the play out of the memory is adapted to play out only those parts of the conference session in which a specified person talked. In other words, the user wishing to play out parts of a conference session, may specify a participant by inputting the name of the specific participant. Then, only those part of the conference in which the specified participant talked will be played out.

The way of displaying an identity of a currently talking participant 101-103, 151-153 to other participant 101-103, 151-153 and 140 in the conference session may vary. One example way is to simply have a piece of text with the name (identity) of the talking participant 101-103, 151-153 being displayed concurrently as he/she speaks. It is then assumed that most of, or all, the partaking participants 101-103, 151-153 and 140 have access to a display device. If the identified currently talking participant 101-103, 151-153 is using a camera and the conference session supports video, the talking participant can be displayed to other participants 101-103, 151-153 and 140 with his/her name displayed concurrently somewhere on the display. As described above, the identity information may be transmitted in the form of metadata associated with the audio or video signals, or on a separate control channel. In this way, the identity information is readily available and displayed to other participants 101-103, 151-153 and 140 receiving the transmitted signals.

Assuming that a participant 101-103, 151-153 who is currently talking is not using a camera or that the conference session does not involve video signals, a view of the talking participant cannot be displayed to other participant 101-103, 151-153 and 140 in the conference session. However, the audio signals may still be associated with the metadata regarding the identified and currently talking participant 101-103, 151-153 or the identity information may be transmitted on a separate control channel. In this way, the identity information is readily available and may be displayed to other participant 101-103, 151-153 and 140 receiving the transmitted signals. The receiving participants 101-103, 151-153 and 140 may not be able to visually see the currently talking participant 101-103, 151-153, only hear him/her, although his/her name (identity) may still be displayed as text on the displays of other participants 101-103, 151-153 and 140.

Figure 2:
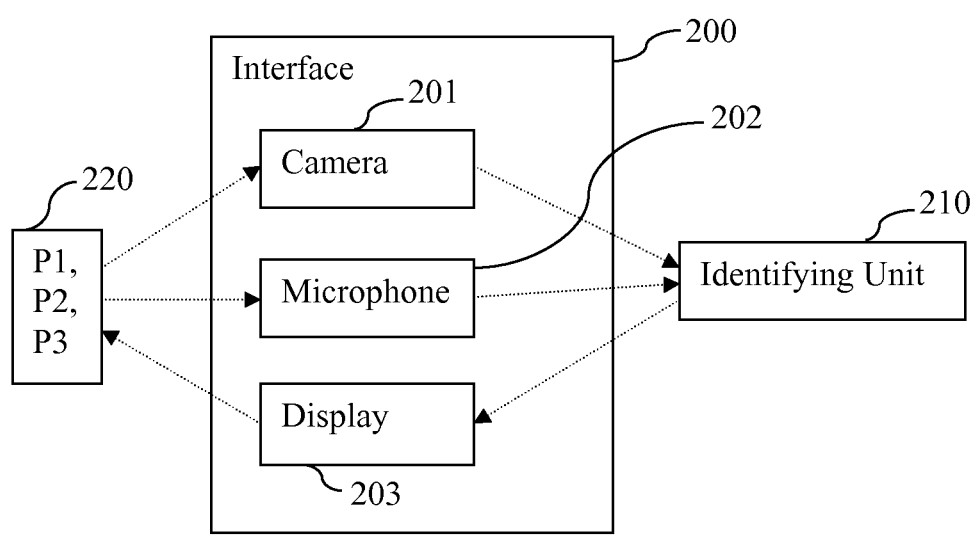
FIG. 2 illustrates an exemplary interface of a recognition apparatus in a conference system or recognition apparatus.

FIG. 2 shows an example of an interface 200 between participants 220 in a conference session being present in a conference room or conference facility and using the recognition apparatus 100, 150 described above.

The interface may comprise a camera 201, a microphone 202 and a display 203. With the aid of the camera 201, biometric characteristics comprising facial recognition may be captured. With the aid of the microphone 202, biometric characteristics comprising voice patterns may be captured. The interface may also comprise a display 203, with which both images of other participants 220 may be displayed as well as the identity of those participants 220, if found and/or available.

In FIG. 1, one example is shown, in which locations AA, BB and CC may represent different companies. Each company may be located at several buildings, in several cities and even several countries. The apparatus may be implemented such that each conference facility only needs to be equipped with an interface such as shown in FIG. 2. The apparatus itself, as well as the database, may be implemented in the internal or private network of a company. This network may cover a building, several buildings in one city or country or even several countries depending on the network of the company in question. The network may also comprise several networks interconnected by e.g. secured links such that a VPN is created for the company, spanning all the locations where the company has a building of facility. The apparatus may alternatively be implemented e.g. such that each conference room is provided with the apparatus, communicating with a database in a network. Another possible implementation is to arrange the apparatus in a public network, connected to a public database such that any person with access to the network may be registered in the database, provided the person has an interface connected to the apparatus. In other words, the apparatus may be company specific or generally accessible. According to yet another example, the database may be implemented within the apparatus and not as a separate unit or node. The apparatus is not limited by its implementation.

Below, a method of recognizing a conference participant currently talking during a conference session will be described with reference to FIGS. 3, 4 and 5. The method has the same or similar advantages and objects as the above described apparatus adapted to recognize a conference participant who is currently talking during a conference session.

Therefore, description of these objects and advantages will not be repeated for every feature.

Figure 3:
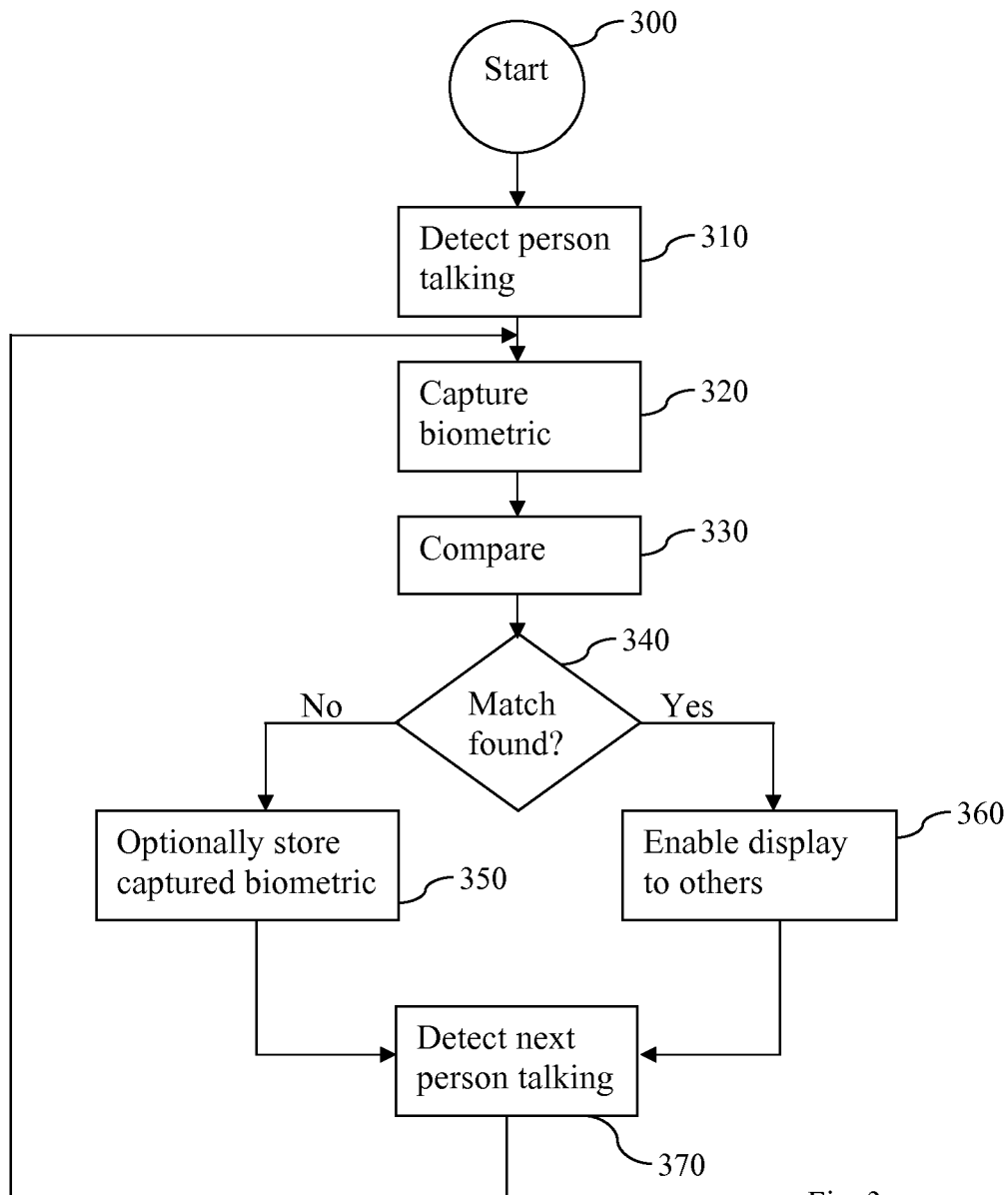
FIG. 3 is a flowchart of an exemplary method for recognizing a conference participant who is currently talking during a conference session.

FIG. 3 is a flowchart of an exemplary method for recognizing a conference participant who is currently talking during a conference session.

FIG. 3 illustrates the method having a first step 310 of detecting that a participant is currently talking. The method also has a step 320 of capturing at least one biometric characteristic of the participant. The method has a further step 330 of comparing the captured biometric characteristic to stored biometric characteristics in a database, each stored biometric characteristics being associated with an owner identity. The method also comprises a step 360 of, when a match is found between the captured biometric characteristic of the participant and a stored biometric characteristic in the database, enabling display of the owner identity associated with the matching participant to other participants in the conference session.

If a match is not found in step 340, no identity of the currently talking participant can be displayed to other participants. In such a case, the captured at least one biometric characteristic, which did have a match in the database may optionally be stored 350 in the database, although this may not be necessary. This will be described below.

In one example, the stored biometric characteristics have been associated with an owner identity during a preceding conference session in which the conference participant was using a personal device. When a person participates in a conference session using a personal device, he/she may be identified by detecting the personal device. If the person is not known to the conference system before, at least one of his/her biometric characteristics is captured and stored in the database comprising stored biometrics, together with his/her personal identity. When the personal device is detected, its identity can be mapped to a personal or owner identity and thereby identify the participant partaking in the conference session using his/her personal device.

In another example, if a match of the captured at least one biometric characteristic of a participant is not found, the captured at least one biometric characteristic is stored in the database, optionally together with any possible RFID, Identity Information from a personal computer, mobile phone or personal conferencing client, or manually inputted Identity Information of the participant.

If a match of the captured at least one biometric characteristic of a participant is not found, the participant may be using the conference system for the first time and is therefore unknown to the conference system. The captured at least one biometric characteristic could then be stored in the database. During or after the conference, the participant in question may enter his/her personal identity into the system, thereby creating a matching in the database comprising the stored biometrics. The participant in question may also be identified during the conference session by an RFID, in case he/she has brought any kind of device or arrangement with him/her carrying an RFID that may identify the participant. The participant may also be identified by detecting a personal device such as a mobile phone, a personal computer or personal conferencing client that may communicate with the conference system in order to identify the participant.

Of course, it may be desirable that the participant who was not identified during the conference session is identified somehow, in order to update the database so that he/he may be identified next time he/she participates in a conference session. Therefore, it is desirable that if a participant is not identified during a conference session, the captured at least one biometric characteristic is stored in the database so that the captured biometric characteristic may be associated with an identity of its owner. As stated above, this can be done during the conference session if the participant in question has brought or is using any type of equipment comprising an RFID, Identity Information from a personal computer, mobile phone or personal conferencing client. In case the participant cannot be identified automatically, he/she can manually input his/her identity information during or after the conference session in order to associate his/her captured at least one biometric characteristic with his/her personal identity or owner identity in the database.

According to one embodiment, a participant may enter his/her personal identity manually at the beginning of the conference session.

In one example, the method further comprises the step of associating audio and/or video signals with metadata comprising the owner identity associated with the matching participant to be displayed to other participants in the conference session or transmitting the identity information on a separate control channel concurrently with the transmission of audio and/or video signals relating to the conference session, in order to enable display of the owner identity associated with the matching participant.

Figure 4:
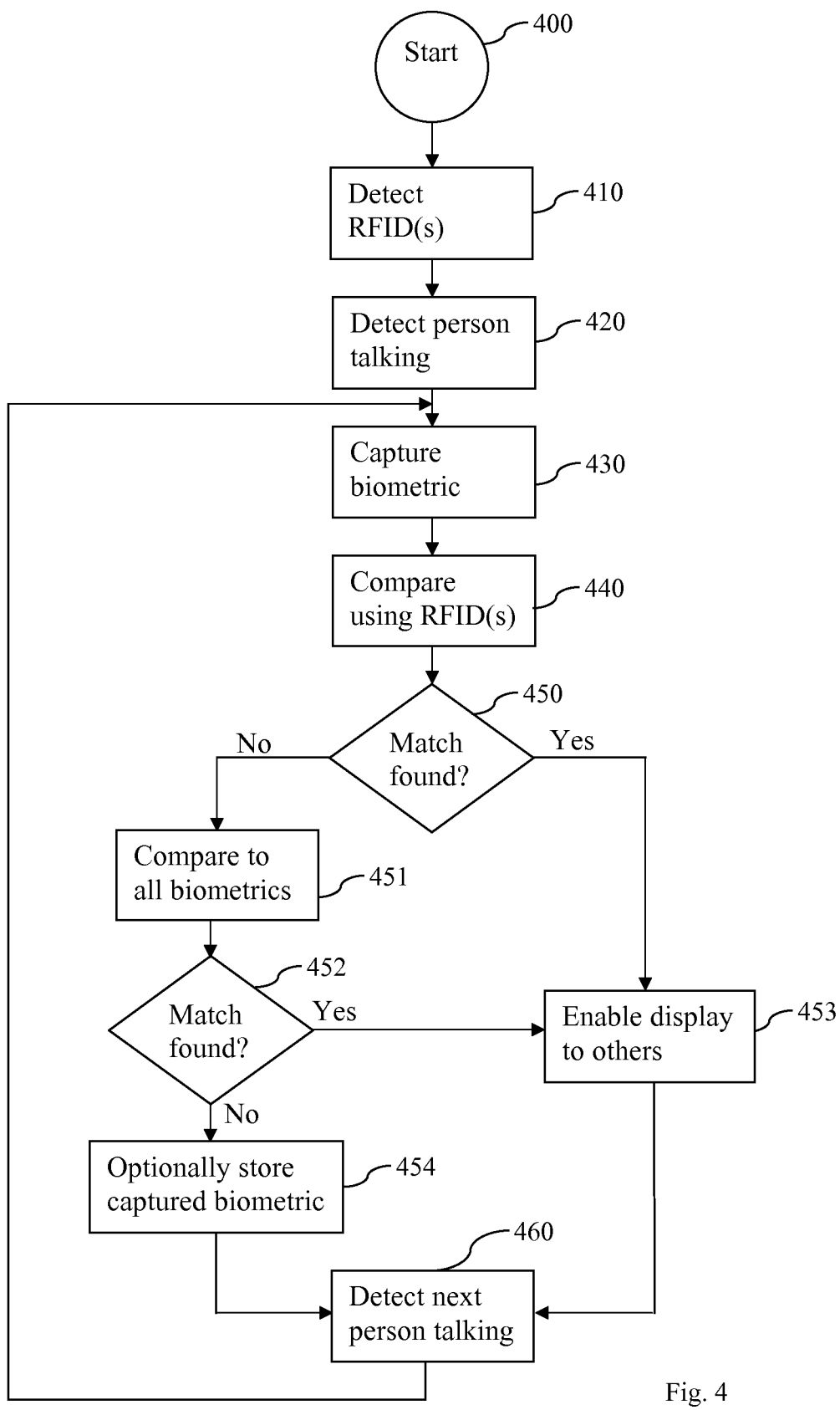
FIG. 4 is a flowchart of another exemplary method for recognizing a conference participant who is currently talking during a conference session.

FIG. 4 is a flowchart of another exemplary procedure for recognizing a conference participant who is currently talking during a conference session. According to this embodiment, the method further comprises the step 410 of detecting any possible RFID(s) identifying respective participant(s) and, after the step 430 of capturing at least one biometric characteristic of a person who is currently talking, comparing 440 the at least one captured biometric characteristic of a participant who is currently talking, firstly to the stored biometric characteristics which is/are associated with the owner identity corresponding to the detected RFID(s) and secondly, if a match is not found, comparing 451 the at least one captured biometric characteristic of a participant who is currently talking to the further stored biometric characteristics.

In more detail, the steps in the procedure of FIG. 4 above may be executed as follows. Firstly, any possible RFID(s) identifying respective participant(s) are detected in step 410. This preferably takes place at the beginning of the conference session. In case the conference session is up and running and a participant enters the conference room or conference facility, and the participant brings an RFID, this is detected as soon as possible in order to detect all RFIDs that are present, which RFIDs identify the respective participants or owners who has brought the REID into the conference room. When it is detected in step 420 that a participant is talking, at least one biometric characteristic is captured in step 430. In step 440, this captured biometric characteristic is compared firstly to the stored biometric characteristics which is/are associated with the owner identity corresponding to the detected RFID(s). If a match is found, the display of the owner identity associated with the matching participant to other participants in the conference session is enabled in step 453. In case no match is found in the comparing step 440, the captured at least one biometric characteristic is compared to the further stored biometric in the database in step 451. In case no match is found, the captured biometric characteristic may optionally be stored in step 454. If a match is found in comparing step 451, the display of the owner identity associated with the matching participant to other participants in the conference session is enabled in step 453.

Some examples of captured biometric characteristics of a participant who is currently talking are voice pattern or facial recognition.

Figure 5:
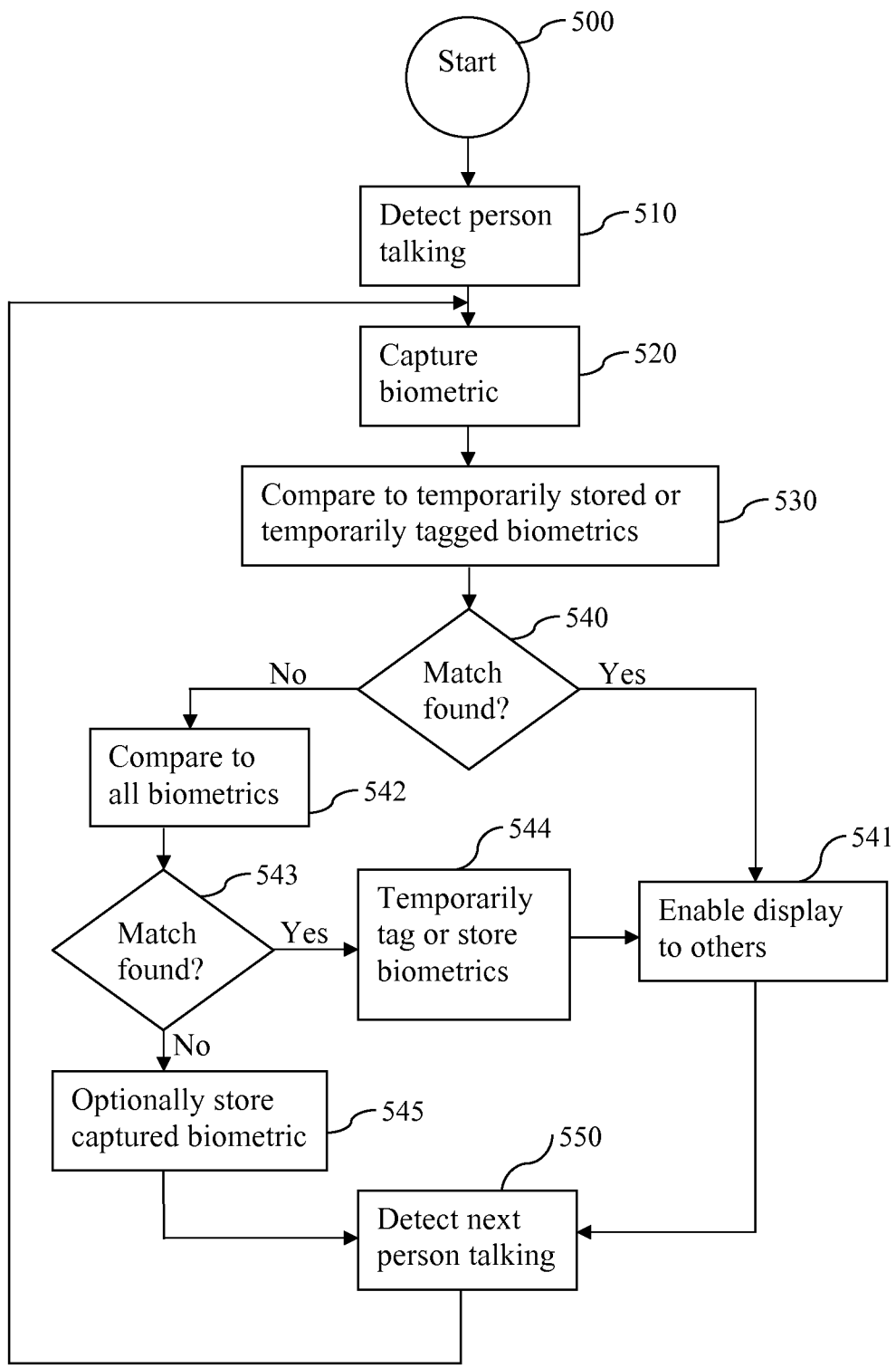
FIG. 5 is a flowchart of yet another exemplary method for recognizing a conference participant who is currently talking during a conference session.

FIG. 5 is a flowchart of yet another exemplary procedure for recognizing a conference participant who is currently talking during a conference session. In this exemplary procedure, a participant is identified for the first time during a conference session, and his/her biometric characteristic is temporarily tagged in the database or temporarily stored in a memory for the duration of the conference session. When at least one biometric characteristic of a participant who is currently talking is captured, this biometric characteristic is firstly compared to the temporarily tagged biometric characteristics in the database or to the temporarily stored biometric characteristics in the memory, and if a match is not found, the captured at least one biometric characteristics is compared to the stored, non-tagged, biometric characteristics in the database.

In more detail, the exemplary embodiment of the method for recognizing a conference participant who is currently talking during a conference session that is illustrated in FIG. 5 comprises the following steps. Firstly, it is detected that a participant in the conference session is talking in step 510. At least one biometric characteristic of this talking participant is captured in step 520. The captured biometric characteristic is firstly compared to temporarily tagged biometric characteristics in the database or to the temporarily stored biometric characteristics in the memory in step 530. If a match is found, in a step 540, the display of the owner identity, associated with the matching participant, to other participants in the conference session is enabled in step 541. In case a match is not found, in step 540, the captured at least one biometric characteristics is compared to all stored biometric characteristics in the database in step 542. If a match is found, in a step 543, the captured biometric characteristic is temporarily tagged in the database for the duration of the conference session or the captured biometric characteristic is temporarily stored in a memory for the duration of the conference session in step 544. Then the display of the owner identity associated with the matching participant to other participants in the conference session is enabled in step 541. In case no match is found at all, the captured biometric characteristic may optionally be stored in step 545. A last step 550 illustrates that a next talking participant is detected, basically corresponding to step 510.

In one example, the method also comprises, when the conference session is ended, the step of erasing the tagging of captured biometric characteristics in the database or emptying the memory comprising the temporarily stored captured biometric characteristics of the temporarily stored biometric characteristics.

According to yet another embodiment, the method comprises the step of recording and storing the conference session in a memory or database together with any possible found identity information of a talking participant.

While the invention has been described with reference to specific exemplary embodiments, the description is generally only intended to illustrate the inventive concept and should not be taken as limiting the scope of the invention. The present invention is defined by the appended claims.

The invention claimed is:

1. An arrangement configured to recognize a conference participant who is currently talking during a conference session, comprising:
   an identifying unit including a biometric detector adapted to capture at least one biometric characteristic of said participant, and
   a comparison unit adapted to compare said biometric characteristic to stored biometric characteristics in a database, each stored biometric characteristic being associated with an owner identity, wherein said stored biometric characteristics have been associated with an owner identity during a preceding conference session in which the conference participant was using a personal device, and
   a display enabler adapted to, when a match is found between said captured biometric characteristic of said participant and a stored biometric characteristic in said database, enable display of the identity associated with the matching participant to other participants in the conference session.

2. The arrangement according to claim 1, further adapted to store said captured at least one biometric characteristic in said database, optionally together with any possible RFID, Identity Information from a personal computer, mobile phone or personal conferencing client, or manually inputted Identity Information of said participant, if a match of said captured at least one biometric characteristic of a participant is not found.

3. The arrangement according to claim 1, wherein the display enabler further is adapted to associate audio and/or video signals, transmitted to other participants in the conference session, with metadata comprising said owner identity of the matching participant or to transmit said identity information on a separate control channel concurrently with the transmission of audio and/or video signals relating to said conference session.

4. The arrangement according to claim 1, wherein said identifying unit further is adapted to detect any possible RFID(s) associated with respective participant(s) and wherein said comparison unit is further adapted to compare the at least one captured biometric characteristic of said participant who is currently talking, firstly to said stored biometric characteristics which is/are associated with the owner identity corresponding to the detected RFID(s) and secondly, if a match is not found, to the all the stored biometric characteristics in said database.

5. The arrangement according to claim 1, wherein said biometric detector is adapted to capture a voice pattern or facial recognition constituting said biometric characteristic of a participant who is currently talking.

6. The arrangement according to claim 1, further comprising a memory adapted to temporarily store said captured biometric characteristic of an identified participant together with the identity of the owner of said biometric characteristic for the duration of the conference session and wherein said comparison unit is adapted to compare a captured biometric characteristic firstly to the temporarily stored biometric characteristics in said memory and secondly, if a match is not found, to the stored biometric characteristics in said database.

7. The arrangement according to claim 1, further being adapted to create a temporary tag for the captured biometric characteristics of an identified participant in said database for the duration of the conference session and wherein said comparison unit further is adapted to compare a captured biometric characteristic firstly to biometric characteristics having a temporary tag in said database and secondly, if a match is not found, to all other stored biometric characteristics in said database, and wherein said arrangement further is adapted to remove said temporary tag(s) when the conference session is ended.

8. The arrangement according to claim 1, further comprising a memory adapted to record and store said conference session together with any possible found identity information of a talking participant.

9. A method of recognizing a conference participant who is currently talking during a conference session, comprising:
   capturing at least one biometric characteristic of said participant, comparing said biometric characteristic to stored biometric characteristics in a database, each stored biometric characteristic being associated with an owner identity, and
when a match is found between said captured biometric characteristic of said participant and a stored biometric characteristic in said database, enabling display of the owner identity associated with the matching participant to other participants in the conference session, wherein said stored biometric characteristics have been associated with an owner identity during a preceding conference session in which the conference participant was using a personal device.

10. The method according to claim 9, wherein if a match of said captured at least one biometric characteristic of a participant is not found, said captured at least one biometric characteristic is stored in said database, optionally together with any possible RFID, Identity Information from a personal computer, mobile phone or personal conferencing client, or manually inputted Identity Information of said participant.

11. The method according to claim 9, wherein the identity of a participant not already known to the conference system is manually inputted at the beginning of the conference session.

12. The method according to claim 9, wherein enabling display of said owner identity associated with the matching participant comprises associating audio and/or video signals with metadata comprising said identity to be displayed to other participants in the conference session or transmitting said identity information on a separate control channel concurrently with the transmission of audio and/or video signals relating to said conference session.

13. The method according to claim 9, further comprising the step of detecting any possible RFID(s) identifying respective participant(s) and comparing said at least one captured biometric characteristic of a participant who is currently talking, firstly to said stored biometric characteristics which is/are associated with the owner identity corresponding to the detected RFID(s) and secondly, if a match is not found, comparing said at least one captured biometric characteristic of a participant who is currently talking to the further stored biometric characteristics.

14. The method according to claim 9, wherein said captured biometric characteristic of a participant who is currently talking is voice pattern or facial recognition.

15. The method according to claim 9, wherein when a participant is identified for the first time during a conference session, his/her biometric characteristics is temporarily tagged in said database or temporarily stored in a memory for the duration of said conference session and when at least one biometric characteristic of a participant who is currently talking is captured, this biometric characteristics is firstly compared to said temporarily tagged biometric characteristics in said database or to the temporarily stored biometric characteristics in said memory, and if a match is not found, the captured at least one biometric characteristics is compared to the stored, non-tagged, biometric characteristics in said database.

16. The method according to claim 15, wherein when a conference session is ended, said tagging of captured biometric characteristics in the database is erased or said memory comprising the temporarily stored captured biometric characteristics is emptied of the temporarily stored biometric characteristics.

17. The method according to claim 9, further comprising recording and storing the conference session in a memory or database together with any possible found identity information of a talking participant.

18. The arrangement according to claim 1, wherein the arrangement is further configured to:
use a device identifier associated with a second personal device to obtain a user identifier to which the device identifier is mapped;
use one or more of received first audio data pertaining to a user of the second personal device and received first video data pertaining to the user to generate first biometric information for identifying the user;
store in said database the generated first biometric information; and
map the stored first biometric information to the user identifier, wherein
the comparison unit is further adapted to compare said biometric characteristic of said participant with said first biometric information to determine whether the participant and the user are likely to be the same individual.

19. The arrangement of claim 18, wherein
said first biometric information for identifying the user comprises first voice characteristic information identifying one or more voice characteristics,
said biometric characteristic of said participant comprises second voice characteristic information identifying one or more voice characteristics, and
the comparison unit is further adapted to compare the first voice characteristic information with the second voice characteristic information to determine whether the participant and the user are likely to be the same individual.

20. The method according to claim 9, further comprising:
using a device identifier associated with a second personal device to obtain a user identifier to which the device identifier is mapped;
generating first biometric information using one or more of first speech data transmitted by the second personal device and first video data transmitted by the second personal device, wherein the speech data corresponds to a vocal communication by a user of the second personal device and the video data includes an image of the user's face;
storing in said database the generated first biometric information; and
mapping the stored first biometric information to the user identifier, wherein
the step of comparing said biometric characteristic of said participant to stored biometric characteristics in the database comprises comparing said biometric characteristic of said participant with said first biometric information to determine whether the participant and the user are likely to be the same individual.

21. The method of claim 20, wherein
said first biometric information for identifying the user comprises first voice characteristic information identifying one or more voice characteristics,
said biometric characteristic of said participant comprises second voice characteristic information identifying one or more voice characteristics, and
comparing said biometric characteristic of said participant with the stored first biometric information comprises comparing the first voice characteristic information with the second voice characteristic information.

* * * * *